G. H. NOBBS.
AIRPLANE VELOCIPEDE.
APPLICATION FILED OCT. 31, 1917.
1,373,444.
Patented Apr. 5, 1921.
3 SHEETS—SHEET 1.
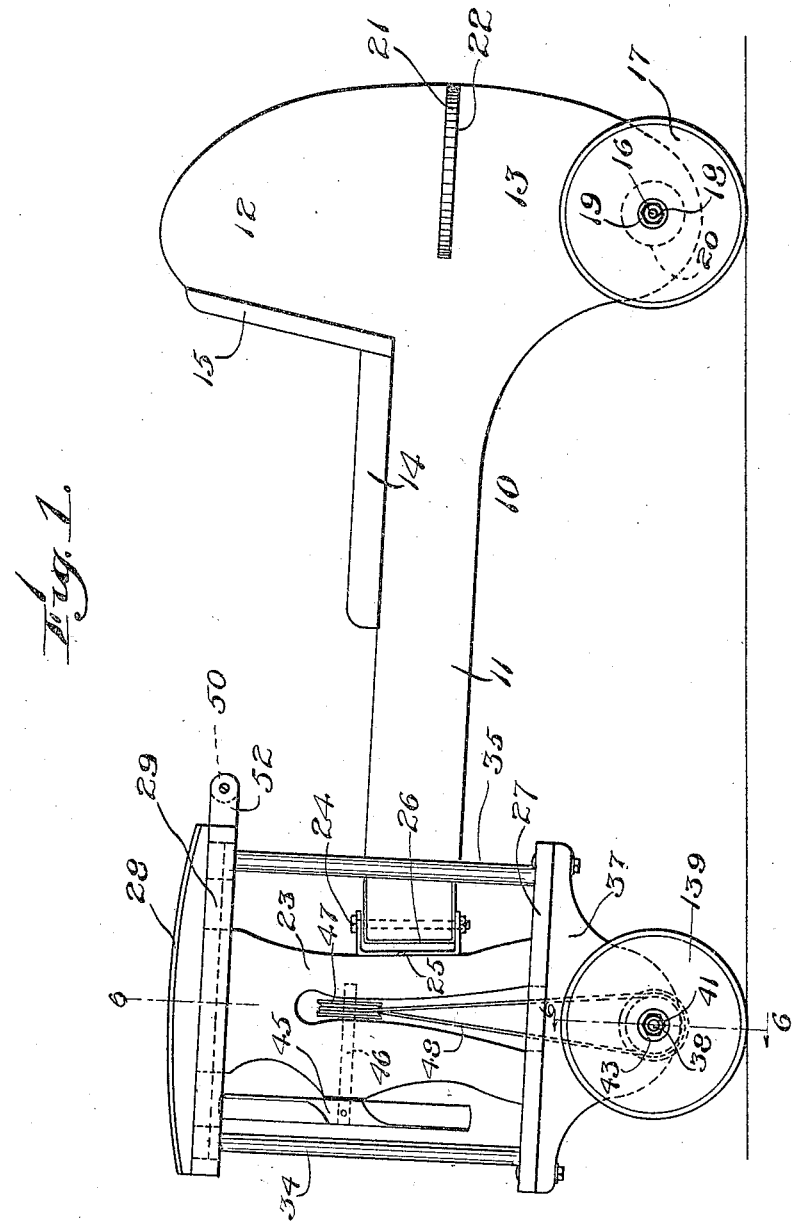

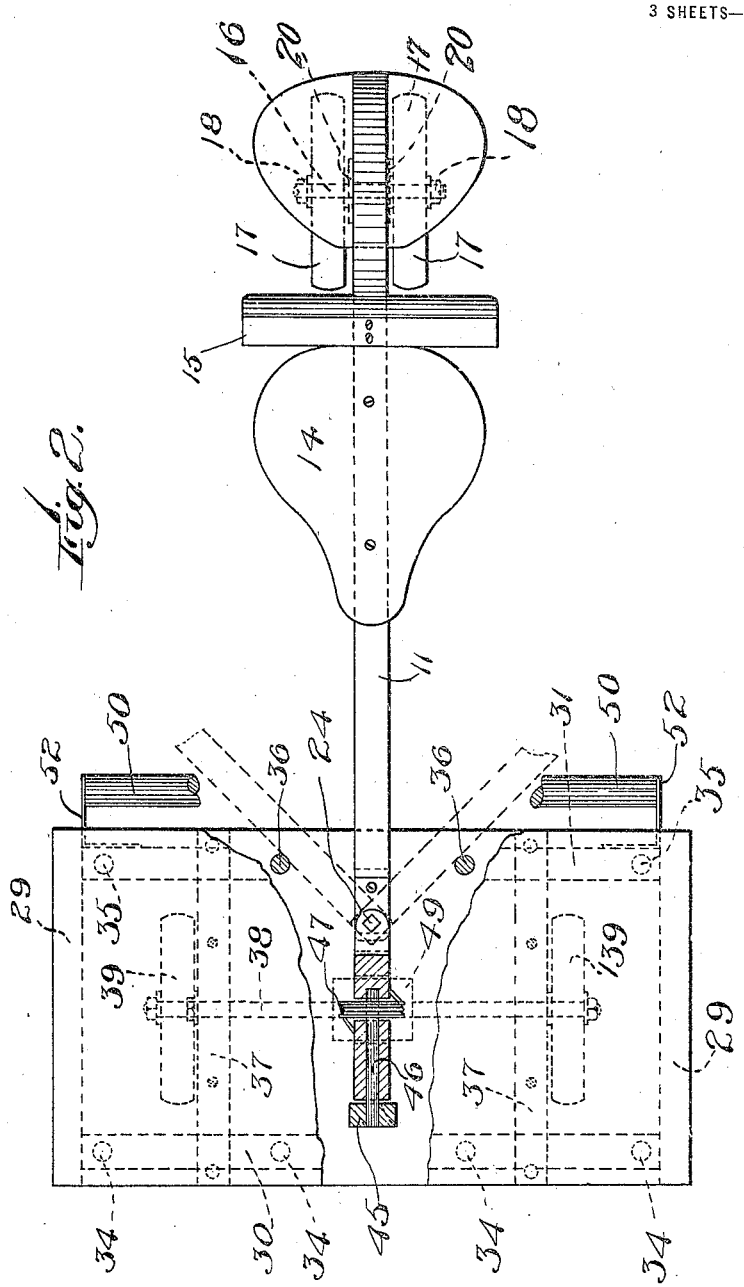

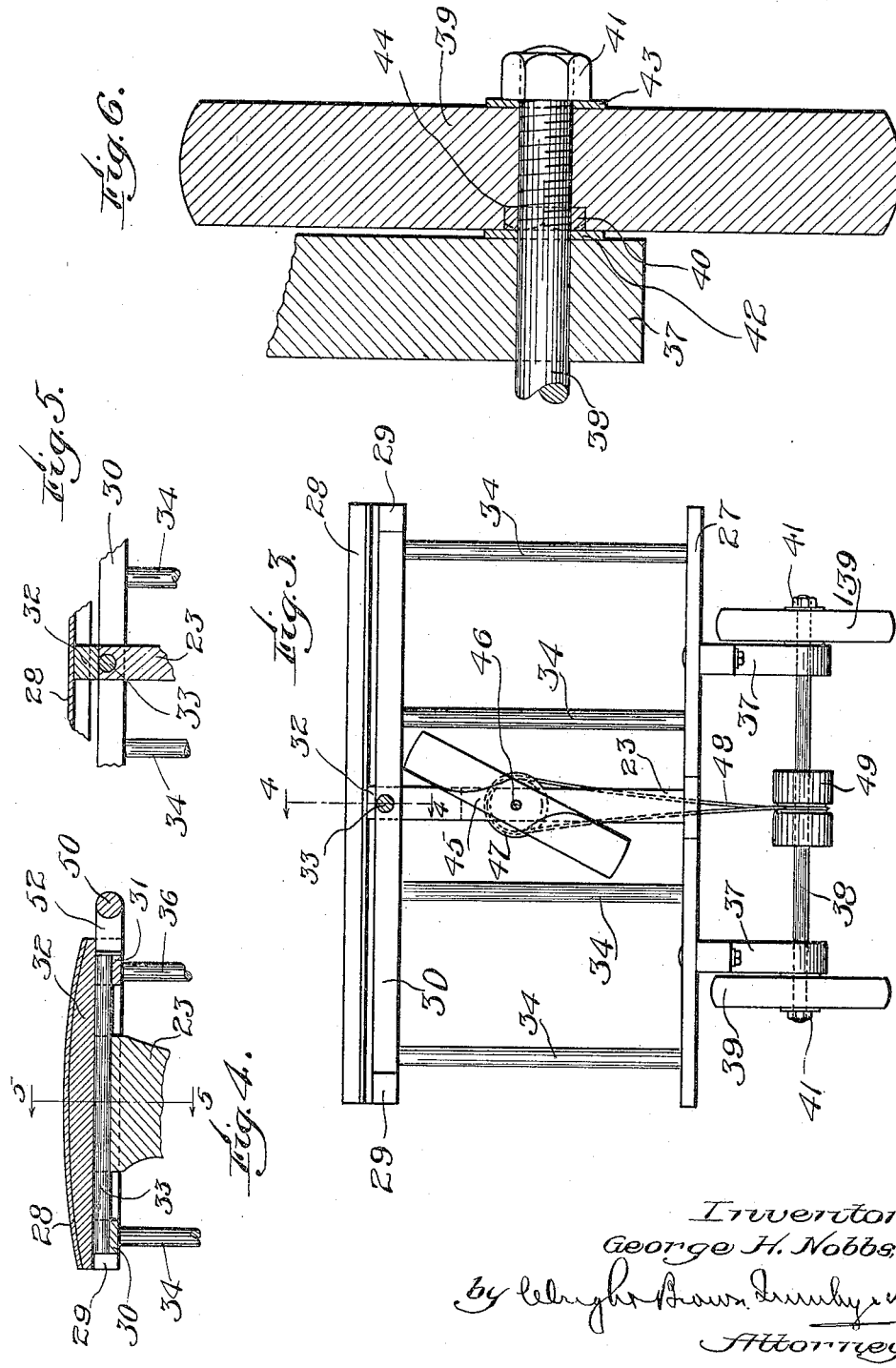

UNITED STATES PATENT OFFICE.

GEORGE H. NOBBS, OF QUINCY, MASSACHUSETTS, ASSIGNOR TO THE PHONOHARP COMPANY, OF EAST BOSTON, MASSACHUSETTS, A CORPORATION OF MAINE.

AIRPLANE-VELOCIPEDE.

1,373,444.   Specification of Letters Patent.   Patented Apr. 5, 1921.

Application filed October 31, 1917.   Serial No. 199,456.

*To all whom it may concern:*

Be it known that I, GEORGE H. NOBBS, a citizen of the United States, residing at Quincy, in the county of Norfolk and State of Massachusetts, have invented new and useful Improvements in Airplane-Velocipedes, of which the following is a specification.

This invention has relation to those wheeled cars which are used by children at play and which are propelled by the engagement of the feet of the child with the ground over which the car travels.

The object of the present invention is to provide a velocipede or car of the type referred to, having a seat, and also having lateral steps upon which the child may stand, so that the one car may support two children at the same time, one occupying the seat and the other standing upon the steps. A second object of the invention is to provide a car which simulates an aeroplane. To this latter end, the car is provided with a propeller, not unlike those employed in tractor planes, a structure in imitation of the plane or planes, and means actuated by the car wheels for rotating the propeller. The steps previously referred to simulate to some extent the tail of an aeroplane.

The invention has for its object to provide certain other improvements which are illustrated upon the drawings, and described and claimed in the following specification.
Referring to said drawings,—

Figure 1 illustrates in side elevation a child's play car embodying the invention.

Fig. 2 represents a plan view of the same, certain parts being broken away and others being in section.

Fig. 3 shows the car in end elevation.

Fig. 4 represents a section on the line 4—4 of Fig. 3.

Fig. 5 represents a section on the line 5—5 of Fig. 4.

Fig. 6 represents a section on the line 6—6 of Fig. 1.

The car comprises a body 10 which may be of wood and which consists of a straight bar 11 which is extended upwardly and downwardly at the rear end as at 12 and 13. A seat 14 is secured crosswise upon the bar so as to project laterally beyond the sides thereof, and the back 15 of the seat is simi-
larly secured to the front of the upward extension 12. The seat is saddle-shaped, so that a child sitting thereon astride the bar 11 may propel the car with his legs and feet. The rear end of the body is supported by one or more wheels. As shown there is passed through the downward extension of the body an axle 16 upon which are located rear wheels 17, 17. The wheels may be affixed to the axle to rotate therewith, or the axle may be fixed and the wheels rotate thereon, as desired. As shown, nuts 18 and washers 19 are located at the ends of the axle, and washers 20 are placed between the wheels and the body of the car. Since the body consists of a relatively thin flat board, set edgewise, the wheels are close together, being separated only by the thickness of the body and the washers 20.

In addition to the seat, the rear portion of the body is provided with a support 21 which is arranged in a slot 22 therein. The support is horizontally located in the rear of the seat and above the wheels 17, and projects laterally from the body, as shown in Fig. 2, to provide two steps, so that a child may stand thereon with both feet, or may stand with one foot on one of them and propel the car with his other foot. The back 15 of the seat 14 or the shoulders of the child sitting on the seat may be grasped by the child so supported by the steps. The seat 14 and the support 21 are in approximately parallel planes, the support being located about midway between the upper and lower extremities of the body. The support also simulates the tail of an aeroplane, and, if not employed as a support, may be made much thinner.

The forward portion of the cart consists of a frame or "plane" structure, comprising an upright 23 to which the front end of the body 11 is pivoted by a king bolt 24 passed through a metal bracket 25. To strengthen the connection and prevent wear, a metal strap 26 is secured on the end of the body. In imitation of the planes of a flying machine, I employ the two members 27, 28. The lower member 27 is made of one or more relatively thin flat boards and is secured to the lower end of the upright. The upper member is curved and is affixed to a rectilinear frame comprising longitudinal end bars 29 and front and rear cross bars 30, 31, all suitably connected together. An intermediate longitudinal bar 32 assists in supporting the top plane or member 28, and it rests upon and is glued or otherwise secured upon the top of the upright 23. To prevent the upright from splitting, it is strengthened and connected to the cross bars 30, 31, by a rod 33 as shown in Figs. 4 and 5. There are four front uprights, rods or braces 34, and similar rear rods or braces 35, 35, 36, 36, extending between the upper and lower planes, in further imitation of a biplane. The bars 36, 36, limit the relative swinging movement of the front and rear portions of the cart as indicated in dotted lines in Fig. 2. Two brackets 37, 37, depend from and are secured to the under side of the lower plane or member 27, and journaled therein is the rotary axle or shaft 38. One wheel 39 is rigidly secured upon one extremity of the axle, and the other 139 is mounted to rotate loosely on the other end of the axle. A convenient means of attaching the wheel 39 is illustrated in Fig. 6. The end of the axle is threaded to receive two nuts 40, 41, which clamp the wheel between them, there being a washer 42 between the nut 40 and the bracket 37, and a washer 43 between the nut 41 and the wheel. In order to reduce the overhang of the end of the shaft, the nut 40 is located in a recess 44 in the wheel.

For the purpose of increasing its similarity to an aeroplane, I employ a two-arm propeller 45 which is affixed upon the front end of a shaft 46 journaled in a socket in the main upright 23. Said upright is bifurcated to receive a pulley 47 secured on the shaft between the journaled portions thereof. Said pulley is driven by an endless cord or belt 48 from a pulley 49 on the axle 38. The cord passes through a hole in the lower plane. Of course, when the cart is in motion and the shaft is actuated, the propeller is rotated. The propeller is located in a vertical plane in the rear of the plane of the upright rods or braces 34, and is arranged between the upper and lower planes so that there is no danger of its causing injury to those playing with the cart or to one with whom the cart may accidentally come in contact.

With the exception of the front and rear axles, the power-transmitting belt, the bracket 25, the strap 26, the bolt, and the screws or other fastenings that are employed in securing the parts together, the car may be made entirely of wood, if desired, and produced at a relatively low cost.

For steering the cart, I employ a transversely arranged handle bar 50 in the rear of and attached to the rear cross bar 31 by angle straps or arms 52. This handle bar is arranged at a convenient distance from the seat.

Preferably the front structure or frame is tilted rearwardly for giving the plane an operative appearance.

It is apparent that various changes may be made in the car or velocipede herein illustrated and described without departing from the spirit and scope of the invention as defined in the claims.

I have described the propeller-driving axle as having one wheel rigidly affixed thereon and the other loosely rotatable thereon. This provides for a differential rotation of the wheels, and enables the cart to be steered to one side or the other without injury to the wheels and is an important feature of the invention, especially as a rotary axle is employed to transmit power for driving the propeller. Of course it is immaterial, except from a standpoint of economy, whether one or two wheels are employed at the rear end of the cart. The rear wheels are so close together as to operate as one.

The lower plane or member 27 serves as a foot rest for a child occupying the seat, and in addition enables the child to steer the structure with his feet, the upright rods 35, 35, preventing his feet from slipping laterally from the edge of said member.

I claim:—

1. A child's velocipede comprising a rigid front structure having a transverse horizontal member simulating the wing of an air-plane and provided with at least one supporting wheel, a wheeled body having a seat located so that the head of the occupant is in a plane above said member, a pivotal connection between said front structure and said body, whereby said velocipede may be steered by the front structure, and a propeller on the front structure operatively connected to said wheel thereof.

2. A child's velocipede comprising a body, a seat thereon, a front structure having a transverse member simulating the plane of an aeroplane, a pivotal connection between the said front structure and said body, and supporting wheels for said body and front structure.

3. A child's velocipede adapted to be propelled by the action of the child's feet on the ground, and comprising a front portion having a transverse member simulating the wing of an air-plane, a rear portion and a pivotal connection between said front and rear portions, supporting wheels for each of said portions, a propeller journaled in said front portion and power-transmitting mechanism for rotating said propeller when the velocipede is in motion.

4. A child's velocipede adapted to be propelled by the action of the child's feet on the ground, and comprising a body, a seat thereon for a child sitting astride said body, a front structure having an imitation plane and projecting laterally beyond the body on both sides, a pivoted connection between the front structure and said body, a propeller journaled in said front structure, a rotary axle, at least one wheel on said axle, and power-transmitting connections between the axle and the propeller.

5. A child's velocipede adapted to be propelled by the action of the child's feet on the ground, and comprising a front structure provided with horizontal transverse members in imitation of an aeroplane, a propeller on said structure, and a body pivoted to the front structure between said horizontal members and provided with a seat.

6. A child's velocipede adapted to be propelled by the action of the child's feet on the ground, and comprising a seat, a frame supporting said seat, wheels, a front structure having transverse horizontal members simulating the wing of an aeroplane, and a pivotal connection between said frame and said front structure and located between said horizontal members.

7. A child's velocipede adapted to be propelled by the action of the child's feet on the ground, and comprising a body, a frame pivoted to the front end thereof having an upright and a horizontal transverse member simulating a plane affixed to the upright, an imitation propeller supported by said structure, a wheel contacting with the ground, and power-transmitting connections between said propeller and said wheel.

8. A child's velocipede comprising a body, a seat whereon the child may sit astride the body to propel the velocipede by the action of his feet on the ground, a front structure having a transverse member simulating the plane of an aeroplane and so located in reference to the seat that the head of the occupant is in planes above the plane of said member, pivoted connections between said body and said structure, supporting wheels for said body and said structure, and means for moving said structure about its pivot.

9. A child's velocipede comprising a body, a seat thereon whereon the child may sit astride the body and propel the velocipede by the action of his feet on the ground, a front structure having a transverse horizontal plate in simulation of the plane of an aeroplane, a rotary axle journaled in said structure, a fixed wheel and a loose wheel on said axle, an imitation propeller journaled on said structure, and a power-transmitting connection between said axle and said propeller.

10. A child's velocipede comprising a body, a seat thereon whereon the child may sit astridge the body and propel the velocipede by the action of his foot on the ground, a structure pivotally connected to the front end of the body and having a transverse horizontal member simulating the plane of a biplane, and independent wheels for supporting said structure and the rear end of the body, said structure affording a foot rest for the child to permit the child to steer the velocipede with his feet.

11. A child's velocipede comprising a body, a seat thereon whereon the child may sit astride the body and propel the velocipede by the action of his feet on the ground, a structure pivotally connected to the front end of the body and having a transverse horizontal member simulating the plane of a biplane, independent wheels for supporting said structure and the rear end of the body, and a steering handle connected to said structure to move it about its pivot.

12. A child's velocipede comprising a body, a seat thereon whereon the child may sit astride the body and propel the velocipede by the action of his feet on the ground, an imitation air-plane structure pivotally connected to the front end of the body, independent wheels for supporting said structure and the rear end of the body, and a foot support on said body on the rear of the seat, on which the child may stand.

13. A child's velocipede comprising a body, a seat thereon whereon the child may sit astride the body and propel the velocipede by the action of his feet on the ground, front and rear supporting wheels, and lateral steps projecting from the body in the rear of said seat and above said rear supporting wheels.

14. A child's velocipede comprising a body, a seat thereon whereon the child may sit astride the body and propel the velocipede by the action of his feet on the ground, a front upright pivoted to the front end of the body to move about a vertical axis, a horizontal imitation plane connected to said upright, an imitation propeller journaled in said front upright, a pair of supporting wheels for the front upright, a pair of wheels for said body, and means for driving said propeller connected to one of said wheels last mentioned.

15. A child's velocipede comprising a body, a seat thereon whereon the child may sit astride the body and propel the velocipede by the action of his feet on the ground, a front upright pivoted to the front end of the body to move about a vertical axis, horizontal imitation planes connected to said upright, sets of upright rods connecting the respective front and rear portions of said planes, an imitation propeller located between the planes and between said sets of rods, and supporting wheels for said body and said upright and planes.

16. A child's velocipede comprising a body consisting of a flat board set edgewise, and having its rear portion projecting downwardly, a seat on the top edge of the board whereon the child may sit to propel the velocipede, an axle passing through said downwardly projecting portion, wheels on said axle, a back affixed to the upwardly projecting portion, a front upright located in front of the flat board and projecting above and below it, a pivotal connection between the front upright and said body, and supporting and steering wheels connected to said front upright.

17. A child's velocipede comprising an imitation biplane, supporting wheels therefor, a propeller thereon driven by one of said wheels, a body pivotally connected to said biplane to permit relative movement about a vertical axis, rotatable means supporting the rear end of said body, a seat on said body, and a foot support on said body in the rear of said seat.

18. A child's velocipede comprising an imitation biplane, supporting wheels therefor, a propeller thereon driven by one of said wheels, a body pivotally connected to said biplane to permit relative movement about a vertical axis, rotatable means supporting the rear end of said body, a seat on said body, and an imitation aeroplane tail on said body.

19. A child's velocipede comprising a body having a portion on which the child may sit to propel the velocipede by contact of his feet with the ground, a front structure having a pair of horizontal transverse members in simulation of the planes of an airplane, a pivotal connection between said front structure and said body located between said transverse members, an imitation tail at the rear of said body, wheels for supporting said front structure and said body, and means for moving said front structure about its pivot.

20. A child's velocipede comprising a body formed of a board set vertically edgewise and having a transverse seat and back supported thereon, a transverse horizontal member located at the front of the body in imitation of an air-plane wing, supporting wheels, a propeller in front of the body and below the plane of said horizontal member, and means for steering said velocipede.

21. A device of the class described comprising a seat supporting bar, wheels on said seat supporting bar, a head pivoted to the bar, said head comprising parallel planes, a strut connecting said planes and having a vertical slot, a propeller shaft extending across the slot, a wheel supporting axle supporting the head, and means between the wheel supporting axle and the propeller shaft for driving said propeller shaft, the drive means being located in the slot.

In testimony whereof I have affixed my signature.

GEORGE H. NOBBS.